United States Patent [19]

Moreau et al.

[11] 3,725,791

[45] Apr. 3, 1973

[54] DIVIDER CIRCUITS

[75] Inventors: Jean Pierre Moreau; Jean Marie Boudry, both of Paris, France

[73] Assignee: Sescosem-Societe Europeene de Semiconducteurs et de Microelectronique

[22] Filed: Aug. 13, 1971

[21] Appl. No.: 171,592

[30] Foreign Application Priority Data

Aug. 21, 1970 France....................................7030699

[52] U.S. Cl. ..........................328/41, 328/37, 328/46, 328/48, 307/215

[51] Int. Cl. ...............................................H03k 21/36

[58] Field of Search .......328/37, 41, 46, 48; 307/215

[56] References Cited

UNITED STATES PATENTS 3,471,779 10/1969 Ley....................................328/37 X 3,521,185 7/1970 Ley....................................328/37 X 3,609,391 9/1971 Hatano et al. .......................328/37 X

*Primary Examiner*—John S. Heyman

*Attorney*—Cushman, Darby & Cushman

[57] ABSTRACT

A divider circuit, comprising an n-stage shift register having a feedback loop for maximum periodicity, is provided. A NOR operator has $n-1$ inputs connected with the first $n-1$ steps of said register and one output, constituting the single output of said divider circuit, loop-connected on to the divider input through an OR operator having a first and a second input, said first input being connected with said divider output and said second input being connected with the output of an "exclusive OR" operator having two inputs respectively connected with two predetermined steps of said register. The division ratio is $2^n$ or $2^n-1$ according as said OR operator is exclusive or non-exclusive.

3 Claims, 3 Drawing Figures

DIVIDER CIRCUITS

The present invention relates to divider circuits comprising a shift register ring-connected for maximum periodicity, the input pulses or clock pulses to which are supplied at a constant recurrence frequency, and furnishing at its output control pulses at a recurrence frequency which is a submultiple of the clock pulse frequency.

Dividers circuits of this kind are known in the art. These dividers comprising stages, in which frequency division is effected by triggering the output pulse when the n stages are in respective predetermined state.

In order to ensure that the register does not stop at the configuration represented by the n stages in the "-zero" state and which is generally stable, that is to say is not modified by the arrival to a new clock pulse, a starter circuit is used and this has the effect of increasing the number of circuit elements and consequently the overall bulk of the divider as well as the current which it draws. These drawbacks are particularly severe ones where a divider is to be produced for a miniaturized apparatus such as an electronic watch.

According to the invention, there is provided a frequency divider avoiding these drawbacks.

The frequency divider for delivering a frequency which is a submultiple of a predetermined frequency comprises a shift register having a feed back loop and $n$ stages respectively numbered 1, 2 . . . $n$, a first input connected to said stage numbered 1, said stages having respective first inputs and outputs, said output of each stage being connected to said first input of the adjacent stage, and respective second inputs for receiving synchronization pulses at said predetermined frequency, said feed back loop comprising an exclusive NOR-operator, having two inputs respectively connected to said outputs of stages respectively numbered $i$ and $k$, with $1 < i < k < n$, and $i$ and $k$ being predetermined for a maximum periodicity for the register and an output ; a NOR operator having $n - 1$ inputs respectively connected to said outputs of said stages numbered 1 . . . $n - 1$ ; and an output, for feeding pulses at said submultiple frequency; a logic operator having an output connected to said input of said stage numbered 1, and two respective inputs respectively connected to said output of said NOR operator, and to said output of said exclusive OR operator.

The invention will be better understood from a consideration of the ensuing description and the attached drawings in which.

Figure 1:
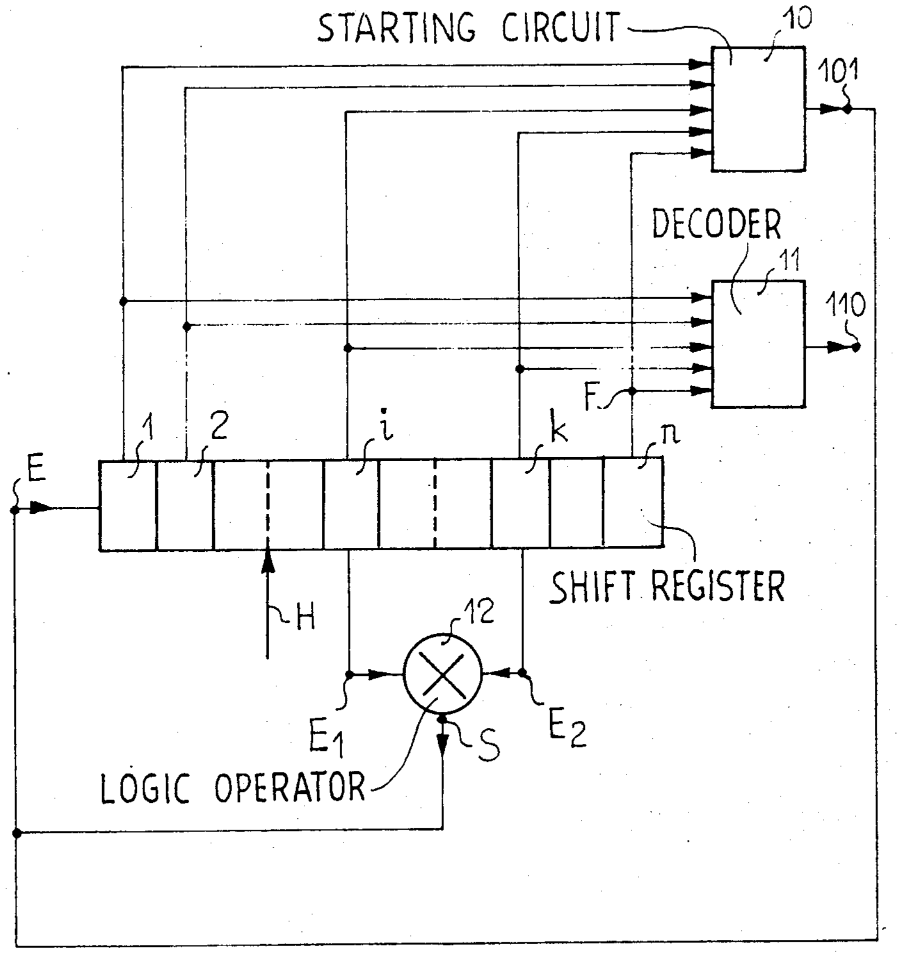
Fig. 1 PRIOR ART
FIG. 1 is a simplified diagram of a divider circuit of known type.

In FIG. 1, blocks 1, 2 . . . $i$, $k$, n have been used to indicate the n stages of the register. Each block of order $i$ constitutes an elementary circuit of the shift register and comprises, as known in the art, a bistable trigger stage for example and means for connection with the ensuing stage, The block of order $n$ has no such connecting means but is directly connected to the output terminal F of the set of $n$ stages.

In this same figure, the starting circuit 10, the decoding circuit 11, the output circuit 110 and the exclusive OR operator 12 with its inputs $E_1$ and $E_2$ connected respectively to the stages $i$ and $k$, have been shown. Circuits of this kind are entirely conventional and their detailed diagrams have not been illustrated.

The output S of the operator 12 and the output 101 of the circuit 10 are connected to the input E of the register.

The detail of certain internal connections has been omitted and in particular the input H for the clock pulses, nor has the connection of the inputs $E_1$ and $E_2$ of the operator 12 to the stages of the shift register, been indicated. The operation of the divider circuit of FIG. 1 will be summarized now and it will be recalled that with each clock pulse the stage of the stage $i$, for example, is transferred to the next stage and that in order to obtain different configurations of the register states, there is re-injected at the input the product of the logic operation carried out by the operator 12, the latter being connected to stages $i$ and $k$ which are so chosen that the "periodicity" of the thus with feedback loop register is a maximum. For a certain configuration, as a function of the coding introduced in the circuit 10, an output pulse will be emitted at a frequency which a submultiple of the clock frequency the function of the circuit 11 being to prevent the register blocking at the all zero configuration.

Figure 2:
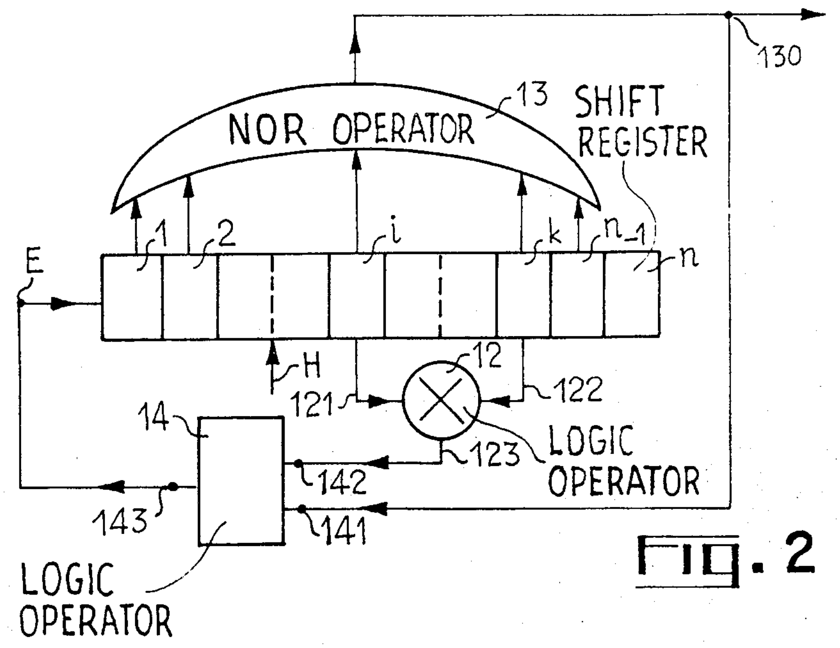
FIG. 2 is a simplified diagram of the circuit in accordance with the invention.

In FIG. 2, in a similar manner the shift register and the operator 12 have been illustrated, one input 121 of the latter being connected to the output of the stage $i$ and the input 122 to the output of the stage $k$.

A NOR operator 13 has $n-1$ inputs respectively connected to the outputs of the $n-1$ first stages of the shift register and an output 130 constituting the output terminal of the divider circuit.

This output is connected to the input 141 of an operator 14 whose second input 142 is connected to the output 123 of an operator 12, the output 143 of the operator 14 being connected to the input E of the register, the clock pulses H being applied to the latter in parallel to the various stages of the latter.

In order to facilitate explanation, hereinafter tables are listed which describe the operation of the NOR, non-exclusive OR and exclusive OR operators.

If $E_1$ and $E_2$ are two inputs of logical operator, whose two possible states 0 and 1 are respectively listed in the top line of the table in the case of the input $E_1$ and in the columns at the left in the case of the input $E_2$, then the output states of the operator will be given at the point of intersection between the columns and lines respectively corresponding to the states of the inputs $E_1$ and $E_2$.

a. NOR operator :

| $E_2$ \ $E_1$ | 0 | 1 |
|---|---|---|
| 0 | 1 | 0 |
| 1 | 0 | 0 |

logic operation $\overline{E_1 + E_2}$ b. OR operator :

| $E_2$ \ $E_1$ | 0 | 1 |
|---|---|---|
| 0 | 0 | 1 |
| 1 | 1 | 1 |

logic operation $E_1 + E_2$ c. Exclusive OR operator :

| | | $E_1$ | |
|---|---|---|---|
| | | 0 | 1 |
| | 0 | 0 | 1 |
| $E_2$ | 1 | 1 | 0 |

logic operation $\bar{E}_1 E_2 + E_1 \bar{E}_2$

By means of the above tables, it is an easy matter in respect of the whole series of states on the part of the input E (or 143), to determine the respective states of the outputs 130 (or 141) and 123 (or 142).

Figure 3:
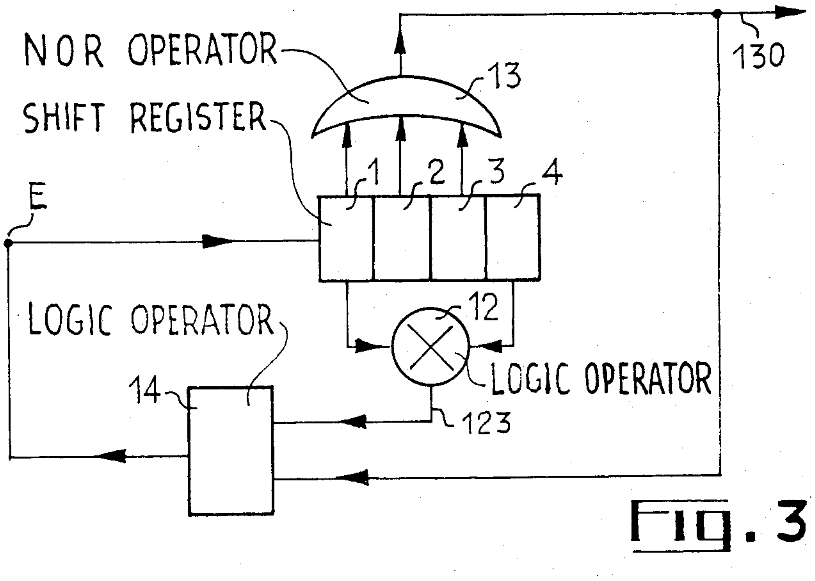
FIG. 3 is a simplified diagram of a circuit comprising a 4 steps register.

1. If the operator 14 is of the exclusive OR-type, then taking the example of FIG. 3, for $n = 4$, the outputs of stage 1 and stage 4 being connected to operator 12 the following table is obtained:

| No. of states | order of stages 1 | 2 | 3 | 4 | output states (130) | + (123) | = (143) |
|---|---|---|---|---|---|---|---|
| 1 | 0 | 0 | 0 | 0 | 1 | 0 | 1 |
| 2 | 1 | 0 | 0 | 0 | 0 | 1 | 1 |
| 3 | 1 | 1 | 0 | 0 | 0 | 1 | 1 |
| 4 | 1 | 1 | 1 | 0 | 0 | 1 | 1 |
| 5 | 1 | 1 | 1 | 1 | 0 | 0 | 0 |
| 6 | 0 | 1 | 1 | 1 | 0 | 1 | 1 |
| 7 | 1 | 0 | 1 | 1 | 0 | 0 | 0 |
| 8 | 0 | 1 | 0 | 1 | 0 | 1 | 1 |
| 9 | 1 | 0 | 1 | 0 | 0 | 1 | 1 |
| 10 | 1 | 1 | 0 | 1 | 0 | 0 | 0 |
| 11 | 0 | 1 | 1 | 0 | 0 | 0 | 0 |
| 12 | 0 | 0 | 1 | 1 | 0 | 1 | 1 |
| 13 | 1 | 0 | 0 | 1 | 0 | 0 | 0 |
| 14 | 0 | 1 | 0 | 0 | 0 | 0 | 0 |
| 15 | 0 | 0 | 1 | 0 | 0 | 0 | 0 |
| 16 | 0 | 0 | 0 | 1 | 1 | 1 | 0 |
| 1 | 0 | 0 | 0 | 0 | 1 | 0 | 1 |

and so on ad infinitum.

Thus, it will be seen that the state 1 appears at the output 130 when the register state has the state 1 and then the state 16. The result is that at the output 1 pulse appears for each 16 clock pulses. The division effected by the circuit is thus division by $2^4$ of the number of clock pulses.

To generalize this to cover an n-stage register, with feed back loop between two stages, it is necessary to know how to determine the orders *i* and *k* to be connected to the second logic operator in order to obtain a maximum periodicity. To this end, recourse must be had to the results of the theory applying to the generation of sequences by shift registers and applying to situations in which loop-connected registers are employed as divider circuits. Information on this is to be found in the article by D.W. LEWIN, entitled "Theory of linear switching circuits" published in the magazine "Control and Automation Progress" edited in London, volume 13, No. 129 of March 1969, pages 196 to 203.

The general case shows that a circuit with n stages would divide by $2^n$.

2. If the operator 14 is of the OR type, then by drawing up a table similar to that of item (1), it is observed that for $n = 4$ the 1 state occurs at the output 130 for the states 2 and 16, and that the "over zero" state disappears from the divider register. The cycle thus contains one state less, namely 25 states in all and the division carried out is by a factor of $2^4 - 1$.

Similarly, as in item (1), the case can be generalized to cover *n* stages. The result is division by $2^n - 1$.

The advantages of the system are especially obvious when the divider circuit is produced in integrated circuit form, in particular in the context of application to an electronic watch.

In other words, the circuit of FIG. 2, since it contains two circuits less than that of FIG. 1 and two more operators, achieves a substantial overall reduction in the number of circuit elements, chiefly thanks to the discarding of the starter circuit.

Self-evidently, the embodiments described by way of example and illustrates here, are in no way limitative of the scope of the invention. In particular, divider circuits constructed by combining the step outputs of the register with the operator 12, in differents ways, fall within the scope of the invention.

In the case of an electronic watch controlled by a crystal oscillating at 8000 cycles per second and thus suppling 8000 pulses per second, it is necessary to divide this number of pulses by $2^{13}$ in order to approximately equate to one second. The register will therefore comprise 13 steps.

What we claim is :

1. A frequency divider for delivering a frequency which is a submultiple of a predetermined frequency comprising a shift register having a first and a second feed back loop and *n* stages respectively numbered (1,2, . . . *n*), a first input connected to said stage numbered (1), said stages having respective first inputs and outputs said output of each stage being connected to said first input of the adjacent stage, and respective second inputs for receiving synchronization pulses at said predetermined frequency, said first feed back loop comprising an exclusive OR - operator, having two inputs respectively connected to said outputs of said stages respectively numbered (i) and (k), with $1<i<k<n$; and (i) and (k) being predetermined for a maximum periodicity for the register, and an output, said first feed back loop comprising a logic operator having an output connected to said input of said stage numbered (1), and having a third and a fourth inputs, said third input being connected to said output of said exclusive OR operator ; said second feed back loop comprising a NOR operator having $N$—1 inputs respectively connected to said outputs of said stages numbered (1 . . . $n$—1), and an output, feeding pulses at said submultiple frequency, said output being connected to said fourth input.

2. A register as claimed in claim 1, wherein said logic operator is an exclusive OR operator.

3. A register as claimed in claim 1, wherein said operator is an OR operator.

* * * * *